UNITED STATES PATENT OFFICE.

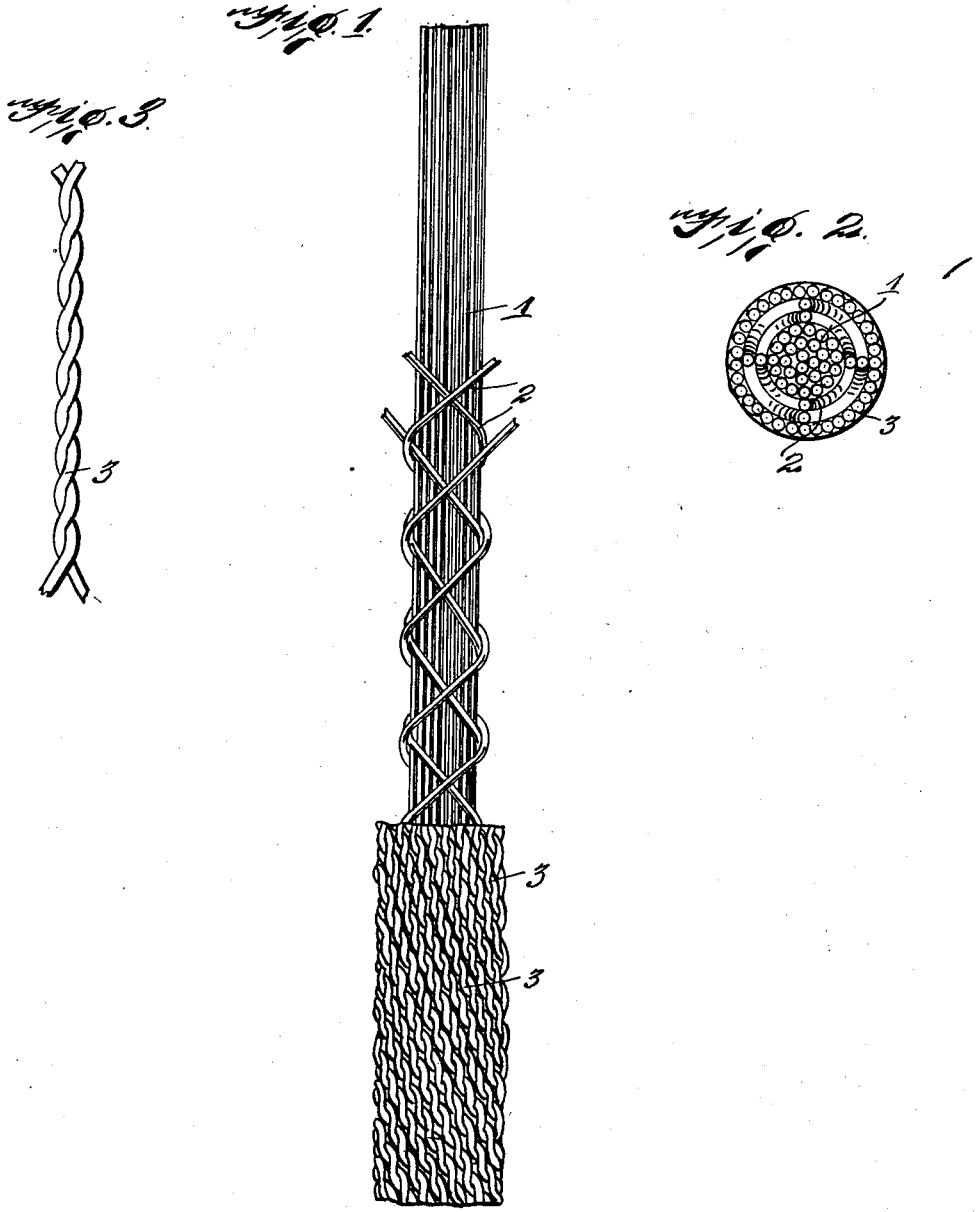

WILLIAM N. RETTINGER, OF BOURBON, INDIANA.

WIRE CABLE.

1,312,872. Specification of Letters Patent. Patented Aug. 12, 1919.

Application filed January 13, 1916. Serial No. 71,971.

*To all whom it may concern:*

Be it known that I, WILLIAM N. RETTINGER, a citizen of the United States of America, residing at Bourbon, in the county of Marshall and State of Indiana, have invented certain new and useful Improvements in Wire Cables, of which the following is a specification, reference being had therein to the accompanying drawing.

This invention relates to wire or metallic cables, and has for its object the production of a simple and efficient cable which is made of a plurality of differently wound strands of metallic wire for producing a reinforced and rigid cable.

Another object of this invention is the production of an efficient cable which may be cheaply and easily manufactured.

With these and other objects in view this invention consists of certain novel combinations, constructions, and arrangements of parts as will be hereinafter fully described and claimed.

In the accompanying drawing:—

Figure 1 is a side elevation of the cable showing portions thereof broken away to illustrate the different portions of wire comprising the cable.

Fig. 2 is an end view of the cable in its finished condition.

Fig. 3 is a side elevation of the outer winding cable.

By referring to the drawings it will be seen that 1 designates the core wires which are arranged in a mass for producing a circular compact body, and a plurality of parallel intermediate coiled wires 2 are wound around these massed core wires 1 to hold the core wires 1 in compact relation. The intermediate coiled wires 2 are arranged in pairs being wound around the core wires in opposite directions as illustrated clearly in Fig. 1. After the coiled wires 2 are wound around the massed wires 1, an outer winding of twisted casing wires 3 is employed passing around the entire outer face of the cable and constituting a covering therefor. The twisted covering wires or casing wires 3 are wound around the core of the cable which is made up of the core wires 1 and the intermediate winding or binding wires 2 so as to closely fit together and produce a substantially solid covering, the wires 3 being wound around the core of the cable at an abrupt angle at substantially 60 degrees.

From the foregoing description it will be seen that a very simple and efficient means has been produced for producing a metallic cable which may produce an efficient or strong tension strength, and at the same time may be sufficiently flexible to permit the cable to be bent or passed around a desired support, such as a pulley or the like.

It should be further understood that by having the outer casing formed of the twisted wires 3 that an efficient reinforcing body has been produced for protecting the core wires 1 which form the central portion of the cable.

It, of course, should be understood that it is not necessary to limit the present cable construction to any particular material or size of cable, as the material and size thereof may be varied according to the desire of the user or manufacturer of the cable.

Having thus described the invention what is claimed as new, is:—

As a new article of manufacture, a cable comprising a central core, said central core comprising a plurality of closely compact longitudinally extending massed wires, a plurality of binding wires passing spirally around said core for holding the wires of said core in compact relation, a covering for said core comprising a plurality of closely arranged strands extending spirally around said core at a greater angle than the binding wires, each of these strands being composed of a plurality of wires twisted together, the convolutions of the strands extending longitudinally of the cable upon the outer face thereof.

In testimony whereof I hereunto affix my signature.

WILLIAM N. RETTINGER.